J. A. THOMSON.
INNER TIRE.
APPLICATION FILED APR. 30, 1913.
1,082,660.
Patented Dec. 30, 1913.
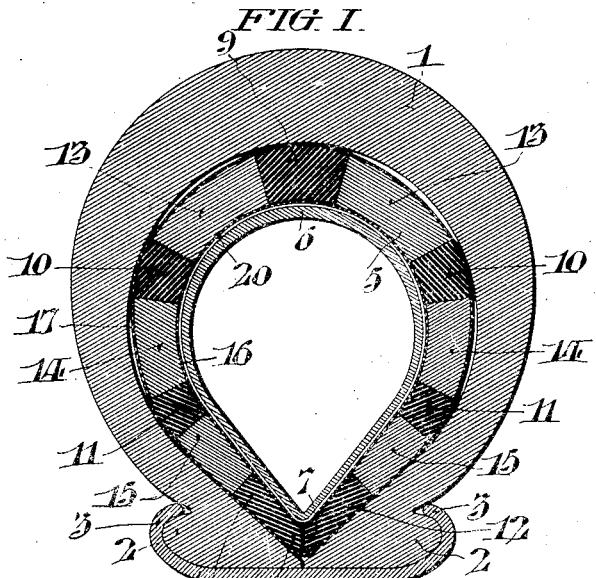
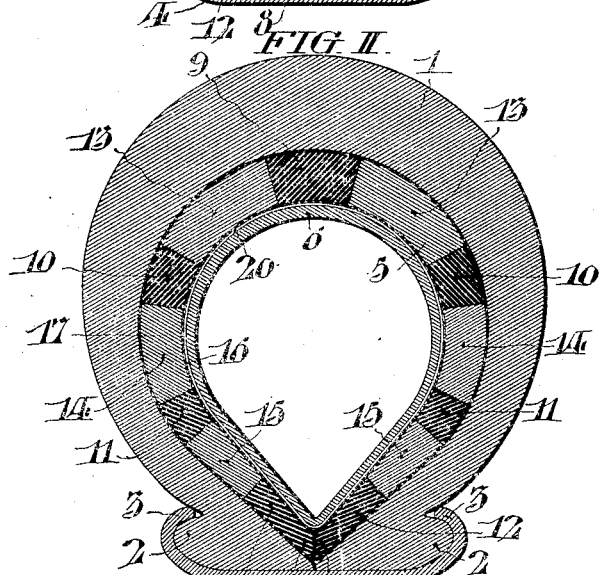
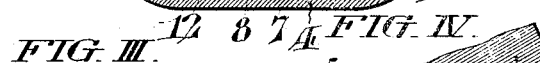
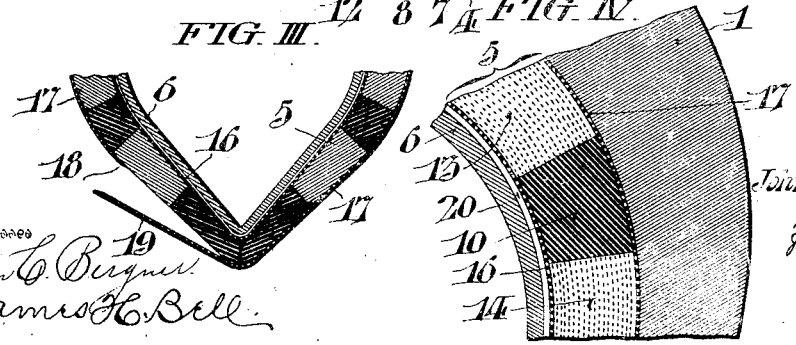

UNITED STATES PATENT OFFICE.

JOHN A. THOMSON, OF ALLENTOWN, PENNSYLVANIA, ASSIGNOR OF ONE-THIRD TO JAMES HENRY HOWARD AND ONE-THIRD TO JOSEPH LAWRENCE HOWARD, BOTH OF ALLENTOWN, PENNSYLVANIA.

INNER TIRE.

1,082,660. Specification of Letters Patent. Patented Dec. 30, 1913.

Application filed April 30, 1913. Serial No. 764,476.

*To all whom it may concern:*

Be it known that I, JOHN A. THOMSON, residing at Allentown, in the county of Lehigh and State of Pennsylvania, have invented certain new and useful Improvements in Inner Tires, whereof the following is a specification, reference being had to the accompanying drawings.

The invention relates more particularly to new and useful improvements in inner tires, for motor vehicles, which inner tire is placed between the inner tube and the outer tire, and protects said inner tube from punctures and blow-outs.

An object of the invention is to provide an inner tube of the above character which is constructed of separate sections, certain of the sections being more elastic than others, so that said inner tire may be made of sufficient thickness as to effectively protect the inner tube, without sacrificing the desired resiliency of the tire.

A further object of the invention is to provide a tire of the above character which is separated at its inner face so as to form meeting edges with an outer fabric covering which projects beyond one of said edges and overlaps the other edge.

These and other objects will in part be obvious, and will in part be hereinafter more fully disclosed.

In the drawings, which show by way of illustration one embodiment of the invention, Figure I, is a sectional view through a tire, and a supporting rim, showing my improved inner tire and its location relative to the inner tube and outer tire, the tire not being inflated. Fig. II, is a similar view showing the tire inflated. Fig. III, is a fragmentary detail showing the overlapping flap for the inner tire. Fig. IV, is an enlarged detail section of a portion of the inner tire, the inner tube, and the outer tire.

In the drawings, I have shown more or less diagrammatically a tire for a motor vehicle which consists of the ordinary outer shoe or tire 1, having beads 2, which engage the curved flanges 3, of a rim 4. Located within this outer shoe or tire 1, is my improved inner tire 5. Disposed within the inner tire 5, is an inner tube 6.

This inner tire which constitutes the invention comprises a body portion which substantially surrounds the inner tube 6, and is separated at its inner face so as to form meeting edges 7, and 8. The body portion is formed of a plurality of arches 9, 10, 11, and 12, which are spaced, and intermediate these spaced arches are arches 13, 14, and 15. Each of the arches 9, 10, 11, and 12, are highly elastic arches. These arches are formed preferably by a plurality of layers of fabric and rubber, the rubber being so much in excess of the fabric as to make the arch highly elastic. The arches 13, 14, and 15, are relatively non-elastic and are referred to hereinafter as fabric arches. These arches are formed preferably of a plurality of layers of fabric and with layers of rubber. The fabric, however, is so much in excess of the rubber that while said arches are slightly elastic, they are, however, relative to the rubber arches, non-elastic. The arches 13, 14, and 15, are of less height or thickness than the arches 9, 10, 11, and 12, as clearly shown in Fig. I, of the drawings.

Said inner tire consists also of an inner layer or layers of fabric 16. The arches are molded and then placed side by side on this inner fabric. The rubber arches are first placed on the inner fabric and disposed substantially as shown in the drawings, and after these arches are set, the fabric arches 13, 14, and 15, are put in place. The fabric arches butt against the rubber arches, and the meeting edges are so shaped as to fit snugly together, so that in actual use the inner tire is substantially one integral structure. A layer or layers of fabric 17, are laid over the arches. This fabric 17, terminates at 18, (Fig. III), and extends about the tire, and projects beyond the edge 7, forming a flap 19. The inner tire made up, as above stated, of the inner layers of fabric, the outer layers of fabric and the alternate rubber and fabric sections, is vulcanized, but at relatively low heat, which gives a longer life to the fabric and the rubber. This inner tire may also be chemically treated if desired to protect the same against wear and moisture.

The inner tire as above constructed is adapted to be placed in any of the well known outer tires. A specially constructed inner tube 6, is placed within this inner tire.

This inner tube is specially constructed for the reason that an outer tire, for example, adapted to take a five-inch inner tube, would, with the use of my improved inner tire, require a four-inch inner tube. The flap 19, is placed around the edge 8, of the inner tire, and enough slack or looseness left in the flap so that upon the inflating of the inner tube, the edges 7, and 8, of the inner tire may separate sufficiently to force the beads of the outer tire into the flanges of the rim.

Before placing the inner tube 6, within the inner tire, I prefer to place a layer 20, of "Pará" rubber, or relatively pure rubber, on the inner face of the inner tire. This layer of rubber, in a measure, causes the inner tube to adhere to the inner tire. After the parts are assembled, as above noted, the inner tube is inflated, and the air pressure of the inner tube expanding the inner tire will compress the relatively elastic sections of rubber, and bring the fabric sections firmly into contact with the outer tire.

The rubber arches or sections are placed at such angles as to stand all strains, both directly on the tread and laterally against the outer face of the outer tire. The fabric arches sustain, in a large measure, the air pressure within the inner tube. This inner tire protects the inner tube from puncturing, owing to the greater distance of the inner tube from the outer face of the outer tire, and also through the actual construction of the inner tire, and the fabric layers connecting the sections of the inner tire.

This inner tire also protects the inner tube from blow-out when the outer tire becomes worn. The inner tube is also capable of use with less air pressure than is necessary where the inner tube is used alone with an outer tire of the construction shown. This also tends to reduce the liability of blow out.

In actual practice a tire of the above construction may be used until the outer tire is worn through in places. Furthermore, said inner tire may be placed in an outer tire, which is considerably worn, and give greater length of time service thereto.

It is obvious that minor changes in the details of construction and the arrangement of parts may be made without departing from the spirit of the invention, as set forth in the appended claims.

Having thus described my invention, I claim:

1. An inner tire comprising a body portion adapted to extend substantially about the inner tube, and separated at its inner face to receive said tube, said body portion consisting of a plurality of longitudinally extending circumferential sections placed side by side, and alternately formed of rubber and fabric, said rubber sections being of slightly greater thickness than the fabric sections.

2. An inner tire comprising a body portion adapted to extend substantially about the inner tube, said body portion having a circumferential rubber section in the central plane of the tire and circumferential fabric sections at each side of said rubber section.

3. An inner tire comprising a body portion adapted to extend substantially about the inner tube, said body portion having a circumferential rubber section in the central plane of the tire and circumferential fabric sections at each side of said rubber section, said rubber section being of slightly greater thickness than the fabric sections.

4. An inner tire comprising a body portion, adapted to extend substantially about the inner tube, said body portion consisting of an inner layer of fabric, circumferential sections of rubber and fabric placed alternately side by side on said fabric, and an outer layer of fabric extending about said inner tire, said rubber sections being of slightly greater thickness than the fabric sections.

5. An inner tire comprising a body portion adapted to extend substantially about an inner tube and separated at its inner face to receive said tube, said body portion consisting of a plurality of longitudinally extending circumferential sections, one section being disposed in the central plane of the tire, the sections on either side of said central section being less elastic than said central section.

In testimony whereof, I have hereunto signed my name at Allentown, Pennsylvania, this 24th day of April 1913.

JOHN A. THOMSON.

Witnesses:
　EDWIN N. STULL,
　MARGARET H. MAGEE.

---

Copies of this patent may be obtained for five cents each, by addressing the "Commissioner of Patents, Washington, D. C."